United States Patent
Fujimori et al.

(10) Patent No.: US 8,154,786 B2
(45) Date of Patent: Apr. 10, 2012

(54) LIGHT CONTROL DEVICE, SEMICONDUCTOR WAFER, AND LIGHT CONTROL SYSTEM

(75) Inventors: Yoshikazu Fujimori, Kyoto (JP); Tsuyoshi Fujii, Kyoto (JP)

(73) Assignee: Rohm Co., Ltd., Kyoto-fu (JP)

( * ) Notice: Subject to any disclaimer, the term of this patent is extended or adjusted under 35 U.S.C. 154(b) by 0 days.

(21) Appl. No.: 12/743,929

(22) PCT Filed: Nov. 20, 2008

(86) PCT No.: PCT/JP2008/071115
§ 371 (c)(1),
(2), (4) Date: May 20, 2010

(87) PCT Pub. No.: WO2009/066728
PCT Pub. Date: May 28, 2009

(65) Prior Publication Data
US 2010/0245970 A1    Sep. 30, 2010

(30) Foreign Application Priority Data
Nov. 20, 2007    (JP) .................................. 2007-300661

(51) Int. Cl.
*G02F 1/03*    (2006.01)
(52) U.S. Cl. ....................................................... 359/245
(58) Field of Classification Search .................. 359/245, 359/246, 248, 251, 252, 254, 237, 322, 323; 385/8, 2, 3; 372/12, 26, 27, 28
See application file for complete search history.

(56) References Cited

U.S. PATENT DOCUMENTS

| | | | |
|---|---|---|---|
| 3,609,007 A * | 9/1971 | Peek | 359/247 |
| 3,813,142 A * | 5/1974 | Buhrer | 385/10 |
| 4,243,300 A * | 1/1981 | Richards et al. | 359/279 |
| 4,379,621 A | 4/1983 | Ikedo et al. | |
| 6,118,571 A * | 9/2000 | Wessels et al. | 359/245 |
| 7,292,739 B2 * | 11/2007 | Shinriki et al. | 385/3 |
| 2002/0031307 A1 | 3/2002 | Kimura | |
| 2003/0013219 A1 * | 1/2003 | Tungare et al. | 438/27 |
| 2006/0092498 A1 | 5/2006 | Sato et al. | |

FOREIGN PATENT DOCUMENTS

| | | |
|---|---|---|
| JP | 56-065177 | 6/1981 |
| JP | 60-006922 | 1/1985 |
| JP | 61-9692 | 1/1986 |

(Continued)

OTHER PUBLICATIONS

J. T. Cutchen et al., "PLZT electrooptic shutters: applications," J. Applied Optics, vol. 14, No. 8, pp. 1866-1873 (Aug. 1975).

(Continued)

*Primary Examiner* — Ricky Mack
*Assistant Examiner* — Tuyen Tra
(74) *Attorney, Agent, or Firm* — Fish & Richardson P.C.

(57) ABSTRACT

A light control device includes: a single crystal substrate (10); an electro-optic thin film (20) which is provided on the single crystal substrate (10) and has an electro-optic effect; and a plurality of electrodes (30, 40) which are provided along a crystal axis of the electro-optic thin film and apply an electrical field along the crystal axis of the electro-optic thin film (20).

1 Claim, 10 Drawing Sheets

FOREIGN PATENT DOCUMENTS

| | | |
|---|---|---|
| JP | 2001-033834 | 2/2001 |
| JP | 2002-090560 | 3/2002 |
| JP | 2005-017648 | 1/2005 |
| JP | 2005-294308 | 10/2005 |
| JP | 2006-133308 | 5/2006 |
| JP | 2006-154145 | 6/2006 |
| JP | 2007-146657 | 6/2007 |
| JP | 2007-148034 | 6/2007 |

OTHER PUBLICATIONS

"Ferroelectric memory advanced process," 1st ed., Science Forum Inc., pp. 151-157 (Sep. 13, 1999).

* cited by examiner

DIRECTION OF CRYSTAL AXIS

LIGHT CONTROL DEVICE, SEMICONDUCTOR WAFER, AND LIGHT CONTROL SYSTEM

TECHNICAL FIELD

The present invention relates to a light control device, and specifically, relates to a light control device, a semiconductor wafer, and a light control system, which use an electro-optic effect.

BACKGROUND ART

In recent years, light control devices are proposed which include materials having an electro-optic effect such as, for example, lead lanthanum titanate zirconate (PLZT). PLZT is transparent ceramics having a composition of $(Pb_{1-y}La_y)(Zr_{1-x}Ti_x)O_3$. The "electro-optic effect" is a phenomenon of a change in refractivity due to polarization generated in a substance to which an electrical field is applied. Using the electro-optic effect, the phase of light penetrating a material having the electro-optic effect can be changed by turning the applied voltage on and off. Hence, the light modulation materials having the electro-optic effect can be applied to the light control devices such as light shutters (see Non patent Citation 1).

In applications of such light shutters and the like to the light control devices, PLZT have been widely used in bulk. However, it is difficult for the light shutters using bulk PLZT to comply with requests for miniaturization, integration, reduction in operating voltage or cost, and the like. Moreover, the bulk method for manufacturing the bulk PLZT includes a step of processing at a high temperature not less than 1000° C. after mixing metal oxides as raw materials. In the case of applying the bulk method to an element formation process, therefore, many restrictions are placed on selection of the materials, element structures, and the like.

Accordingly, studies are being conducted on use of thin film materials formed on base materials (see Non patent Citation 2 and patent Citations 1 to 3, for example). For example, a light control device is proposed which includes a structure provided with polarizers on both sides of a display substrate on which PLZT films or the like are formed as thin-film materials having the electro-optic effect instead of the bulk PLZT. The electrode terminal portions of individual pixels of the display substrate are connected to an external drive circuit, and desired pixels are individually driven to provide a desired display with penetrating light from a light source provided on one side of the display substrate.

[Non patent Citation 1] J. Thomas Cutchen, et al., "Applied Optics vol. 14 No. 8", August 1975, p. 1866-1873
[Non patent Citation 2] "Ferroelectric Memory Advanced Process", 1st ed., Science Forum Inc., 13 Sep. 1999, p. 151-157
[Patent Citation 1] Japanese Patent Laid-open Publication No. 2007-146657
[Patent Citation 2] Japanese Patent Laid-open Publication No. 2005-294308
[Patent Citation 3] Japanese Patent Laid-open Publication No. 2006-154145

DISCLOSURE OF INVENTION

Technical Problems

The light control devices such as light shutters are being improved in performance by attempts of applying the PLZT thin film formed on base materials to the light control devices. However, the operating voltage remains high yet, and the speed of switching light is slow.

In the light of the aforementioned problems, an object of the present invention is to provide a light control device, a semiconductor wafer, and a light control system in which the light shutter operation is provided at low operating voltage and switching speed of the light shutter operation is high.

Technical Solution

According to an aspect of the present invention, a light control device includes: a single crystal substrate; an electro-optic thin film which is provided on the single crystal substrate and has an electro-optic effect; and a plurality of electrodes which are provided along a crystal axis of the electro-optic thin film and apply an electrical field along the crystal axis of the electro-optic thin film.

According to another aspect of the present invention, a semiconductor wafer having an orientation flat extending in the direction of a crystal axis <21•2> includes: a single crystal substrate; an electro-optic thin film which is provided on the single crystal substrate and has an electro-optic effect and whose principal plane is (101) plane; and a plurality of electrodes applying an electrical field in a direction at about 35° with respect to the orientation flat of the electro-optic thin film. According to still another aspect of the present invention, a light control system includes: a plurality of light control devices arranged in a two-dimensional array, each light control device including: a single crystal substrate; an electro-optic thin film which is provided on the single crystal substrate and whose principal plane is (101) plane; and a plurality of electrodes which are provided on the electro-optic thin film along the crystal axis of the electro-optic thin film and apply an electrical field along the crystal axis of the electro-optic thin film; and transistors controlling voltage supplied to the electrodes.

Advantageous Effects

According to the present invention, it is possible to provide a light control device, a semiconductor wafer, and a light control system in which a light shutter operation is provided at low operating voltage and the switching speed of the light shutter operation is high.

BEST MODE FOR CARRYING OUT THE INVENTION

Figure 1:
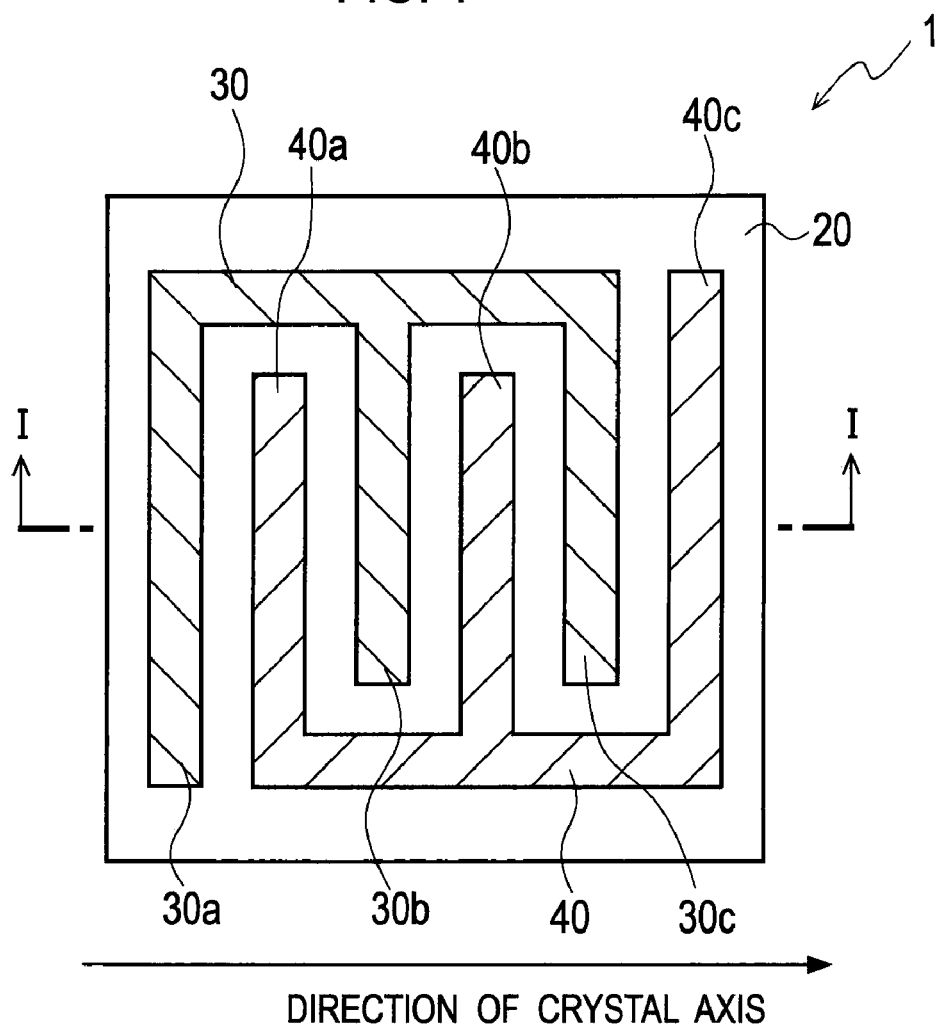
FIG. 1(a) is a plan view of a light control device according to an embodiment of the present invention.
FIG. 1(b) is a cross-sectional view in a direction I-I shown in FIG. 1(a).
Figure 1:
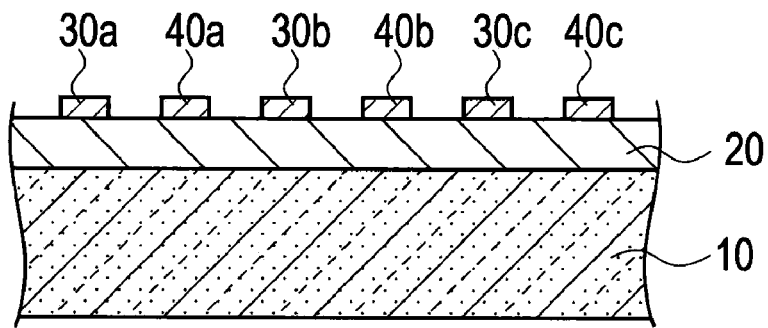

Next, with reference to the drawings, an embodiment of the present invention will be described. In the following description of the drawings, same or similar parts are given same or similar referential symbols or numbers. The drawings are schematic, and the relation between thickness and planar dimensions, the proportion of thicknesses of layers, and the like in the drawings are different from real ones. Accordingly, specific thicknesses and dimensions should be determined referring to the following description. Moreover, it is certain that some portions have different dimensional relations or different proportion in the drawings.

As shown in FIGS. 1(a) and 1(b), a light control device 1 according to an embodiment of the present invention includes a single crystal substrate 10; an electro-optic thin film 20 which is provided on the single crystal substrate 10 and has an electro-optic effect; and a plurality of electrodes 30 and 40 which are provided along the crystal axis of the electro-optic thin film 20 and apply an electrical field along a crystal axis of the electro-optic thin film 20.

The single crystal substrate 10 has a function as a mechanically supporting substrate for epitaxial growth of the electro-optic thin film 20. The single crystal substrate 10 can be a sapphire ($Al_2O_3$) substrate, a magnesium oxide (MgO) substrate, a strontium titanate (STO) substrate, a silicon (Si) substrate, or the like.

The electro-optic thin film 20 is composed of a material having the electro-optic effect that when an electrical field is applied to the material, the material polarizes and changes in refractivity. The electro-optic thin film 20 can be composed of PLZT, piezoelectric zirconate titanate (PZT), lithium niobate ($LiNbO_3$), gallium arsenide multiple-quantum well structure (GaAs-MQW), SBN ($(Sr, Ba)Nb_2O_6$), or the like and preferably composed of PLZT.

Each of the electrodes 30 and 40 is a comb-shaped electrode as shown in FIG. 1(a). The electrode 30 includes electrode pieces 30a, 30b, and 30c as comb teeth, and the electrode pieces are maintained at a same electrical potential. The electrode 40 includes electrode pieces 40a, 40b, and 40c as comb teeth, and the electrode pieces 40a, 40b, and 40c are maintained at a same electrical potential. The electrode pieces 30a to 30c and 40a to 40c are configured to have a same width. The electrode pieces 30a to 30c of the electrode 30 and the electrode pieces 40a to 40c of the electrode 40 are alternately arranged at equal intervals. The electrodes 30 and 40 are made of, for example, platinum (Pt), indium (Ir), iridium oxide ($IrO_2$), or the like. The electrodes 30 and 40 are formed by depositing a Pt film or the like by sputtering, printing patterns of the electrodes 30 and 40 on a photoresist film by photolithography, and then etching the Pt film using the photoresist film as a mask.

Hereinafter, with reference to FIGS. 2 and 3, a description is given of the principle of the light shutter of the light control device 1 including the electro-optic thin film 20 made of PLZT or the like. First and second polarizers 50 and 52 have different directions of polarization at 90 degrees in an x-y plane.

When natural light propagating in the Z-axis direction is incident on the first polarizer 50 as incident light, the natural light having passed through the first polarizer 50 is polarized and is then incident on the light control device 1 having the electro-optic thin film 20.

Figure 2:
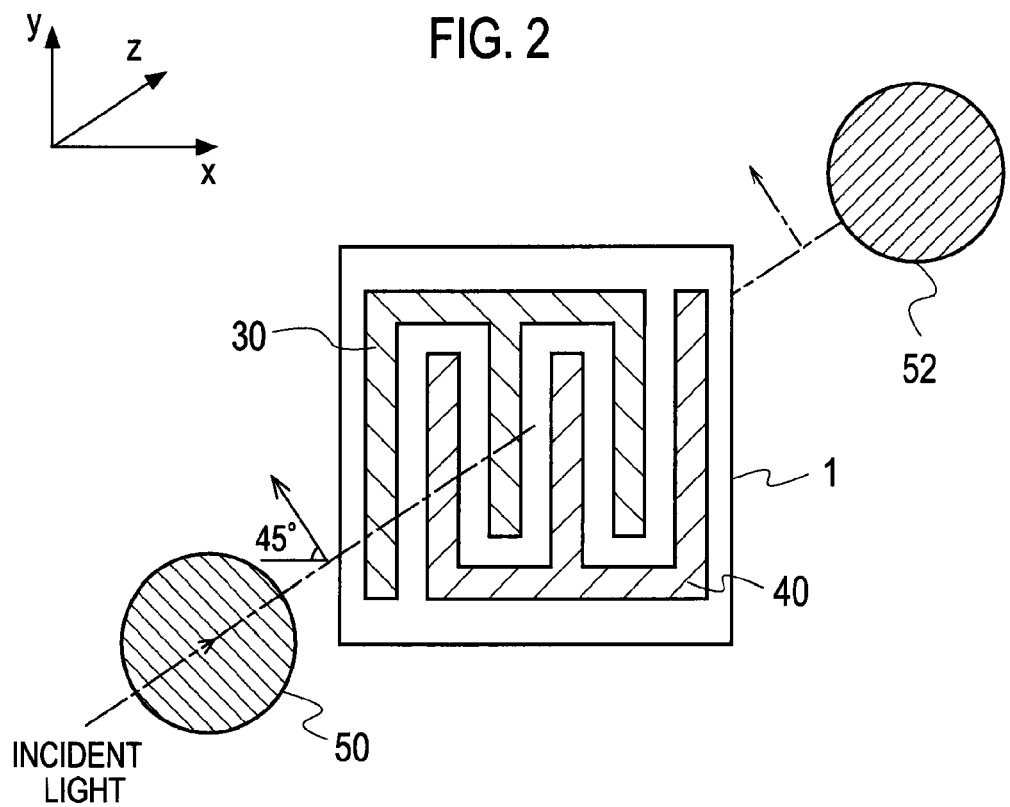
FIG. 2 is a view explaining the principle of a light shutter of the light control device according to the embodiment of the present invention, showing a case where no electrical field is applied.

FIG. 2 shows a case where no voltage is applied to the electrodes 30 and 40 of the light control device 1. The electro-optic thin film 20 polarizes and changes in refractivity to have birefringence when an electrical field is applied thereto. Accordingly, when no voltage is applied to the electrodes 30 and 40, the electro-optic thin film 20 outputs the incident light without rotating the polarization thereof. Accordingly, when no voltage is applied to the electrodes 30 and 40, the polarized light having transmitted through the first polarizer 50 and light control device 1 is shut off by the second polarizer having a direction of polarization 90 degrees different from that of the first polarizer 50 in the x-y direction.

Figure 3:
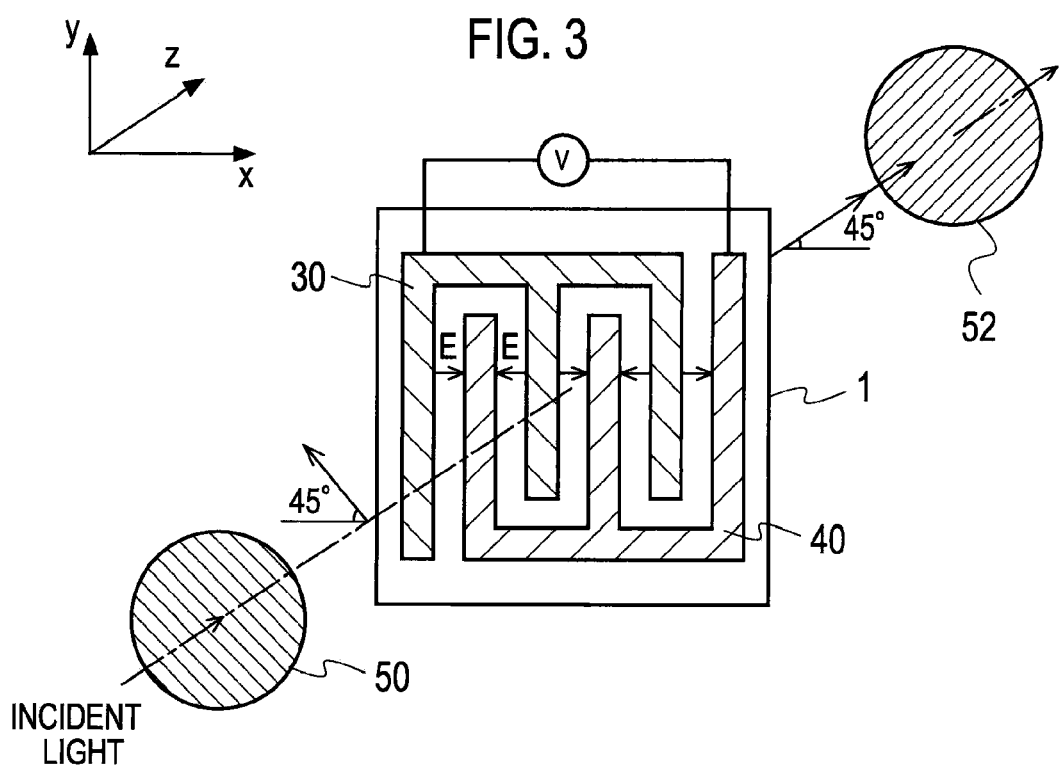
FIG. 3 is a view explaining the principle of the light shutter of the light control device according to the embodiment of the present invention, showing a case where an electrical field is applied.

FIG. 3 shows a case where voltage V is applied to the electrodes 30 and 40 of the light control device 1. In the electro-optic film 20, the electrical field E between the electrodes 30 and 40 causes birefringence. Accordingly, if voltage is applied to between the electrodes 30 and 40, the incident light is outputted with the polarization thereof rotated by 90 degrees. Accordingly, when voltage is applied to between the electrodes 30 and 40, the polarized light having penetrated the first polarizer 50 and light control device 1 is transmitted through the second polarizer 52.

Hereinafter, with reference to FIGS. 4 to 7, the electro-optic effect of the electro-optic thin film 20 is described. For quantitative comparison of the electro-optic effect, the electro-optic coefficient r is calculated and used. The electro-optic coefficient r is a coefficient of proportionality of an amount of change in refractivity due to the application of the electrical field, and the unit thereof is distance (pm: picometer)/voltage (V: volt). In other words, the larger the electro-optic coefficient r is, the lower the voltage applied to the electrodes 30 and 40 can be set or the shorter the refractivity change region can be set.

Figure 4:
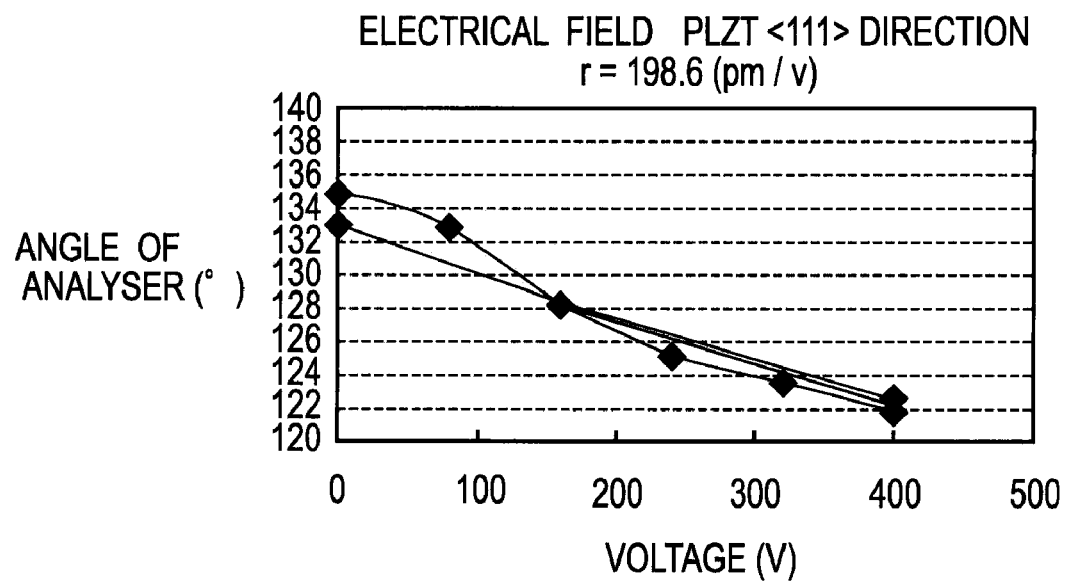
FIG. 4 is a graph (No. 1) for calculating an electro-optic coefficient of an electro-optic thin-film of the light control device according to the embodiment of the present invention.

First, the graph of FIG. 4 shows an electro-optic effect in the case of applying the electrical field along the <111> axial direction of the electro-optic thin film 20 in the light control device in which the electro-optic thin film 20 with (101) plane of PLZT epitaxially grown is formed on the single crystal substrate 10 of a sapphire substrate whose principal plane is R-plane and the electrodes 30 and 40 are provided along the <111> axial direction of the electro-optic thin film 20. In this case, the electro-optic coefficient r of the light control device is 198.6 pm/V.

Figure 5:
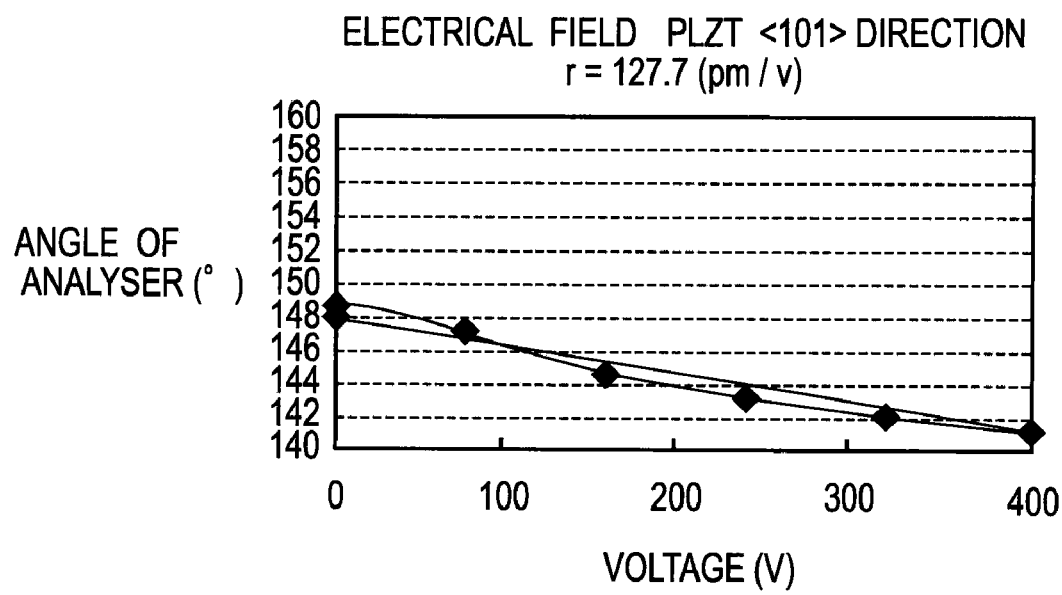
FIG. 5 is a graph (No. 2) for calculating the electro-optic coefficient of the electro-optic thin-film of the light control device according to the embodiment of the present invention.

The graph of FIG. 5 shows an electro-optic effect in the case of applying the electrical field along the <101> axial direction of the electro-optic thin film 20 in the light control device in which the electro-optic thin film 20 with (101) plane of PLZT epitaxially grown is formed on the single crystal substrate 10 of a sapphire substrate whose principal plane is R-plane and the electrodes 30 and 40 are provided along the <101> axial direction of the electro-optic thin film 20. In this case, the electro-optic coefficient r of the light control device is 127.7 pm/V.

Figure 6:
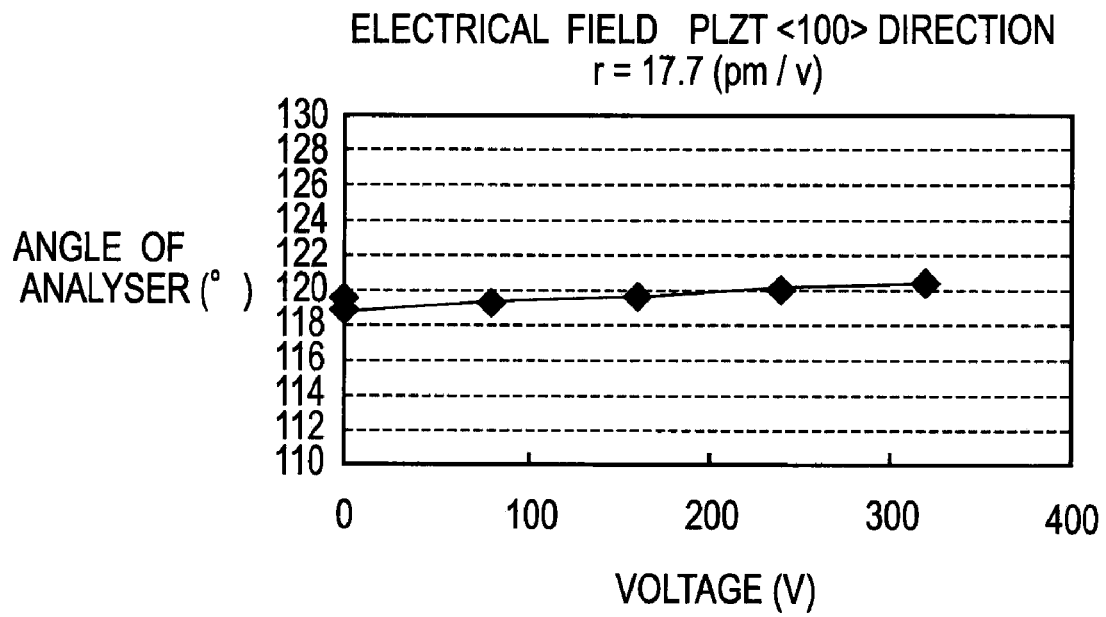
FIG. 6 is a graph (No. 3) for calculating the electro-optic coefficient of the electro-optic thin-film of the light control device according to the embodiment of the present invention.

The graph of FIG. 6 shows the electro-optic effect in the case of applying the electrical field along the <100> axial direction of the electro-optic thin film 20 in the light control device in which the electro-optic thin film 20 with (101) plane of PLZT epitaxially grown is formed on a single crystal substrate 10 of a sapphire substrate whose principal plane is R-plane and the electrodes 30 and 40 are provided along the <100> axial direction of the electro-optic thin film 20. In this case, the electro-optic coefficient r of the light control device is 17.7 pm/V.

Figure 7:
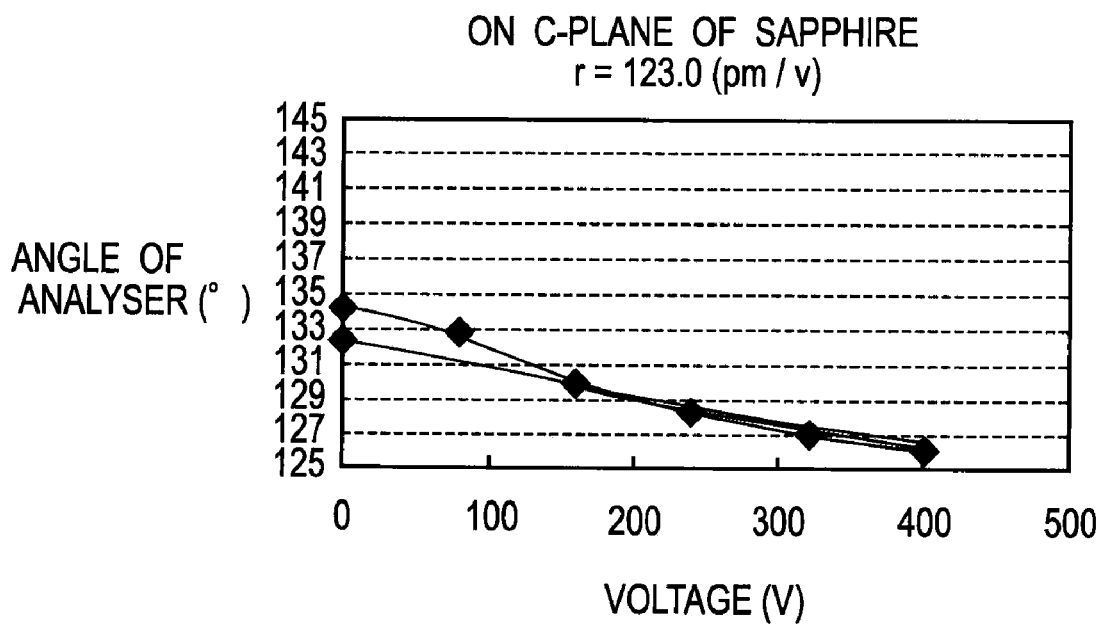
FIG. 7 is a graph (No. 4) for calculating the electro-optic coefficient of the electro-optic thin-film of the light control device according to the embodiment of the present invention.

The graph of FIG. 7 shows the electro-optic effect in the case of applying the electrical field to the electro-optic thin film 20 in the light control device in which the electro-optic thin film 20 of non-oriented PLZT is formed on a single crystal substrate 10 of a sapphire substrate whose principal plane is C-plane and the electrodes 30 and 40 are provided on the electro-optic thin film 20. In this case, the electro-optic coefficient r of the light control device is 123.0 pm/V.

The result with the best electro-optic effect of the electro-optic thin film 20 in the graphs of FIGS. 4 to 7 is the result shown in FIG. 4 having the largest electro-optic coefficient r. The reason why the electro-optic coefficient r under the condition shown in FIG. 4 was the largest among the conditions under which the graphs of FIGS. 4 to 7 were produced is thought to be because PLZT is polarized along the <111> axial direction and the application of the electrical field along the crystal axis <111> of the electro-optic thin film 20 can efficiently produce the electro-optic effect. In other words, the condition to efficiently produce the electro-optic effect of the electro-optic thin film 20 is to apply the electrical field along the crystal axis <111> of the electro-optic thin film 20. The electrodes 30 and 40, which apply the electrical field along the crystal axis <111> of the electro-optic thin film 20, are preferably provided on the (101) plane of the electro-optic thin film (PLZT) 20 including the crystal axis <111>.

The preferred orientation of the crystal plane and the like can be known by measuring the crystal plane of the electro-optic thin film 20 in terms of crystal diffraction intensity through X-ray diffraction. The X-ray diffraction of the crystal plane of the electro-optic thin film 20 is described using FIGS. 8 to 12.

Figure 8:
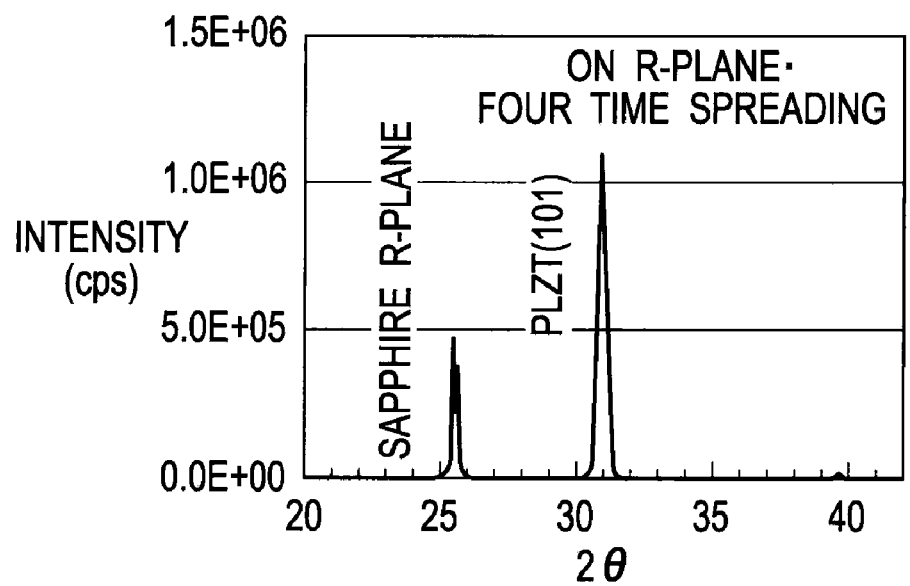
FIG. 8 is a graph (No. 1) measuring a crystal plane of the electro-optic thin film of the light control device according to the embodiment of the present invention by 2θ-ω scan.

The graph shown in FIG. 8 shows the result of 2θ-ω scan. There are a peak of 25.6° indicating the R-plane of the sapphire substrate and a peak of 30.1° indicating the (101) plane of PLZT. The graph of FIG. 8 therefore reveals that the crystal planes (101) of PLZT are equally oriented upward on the R-plane of the sapphire substrate (preferred orientation). However, it is not known whether PLZT of the electro-optic thin film 20 is epitaxially grown.

Figure 9:
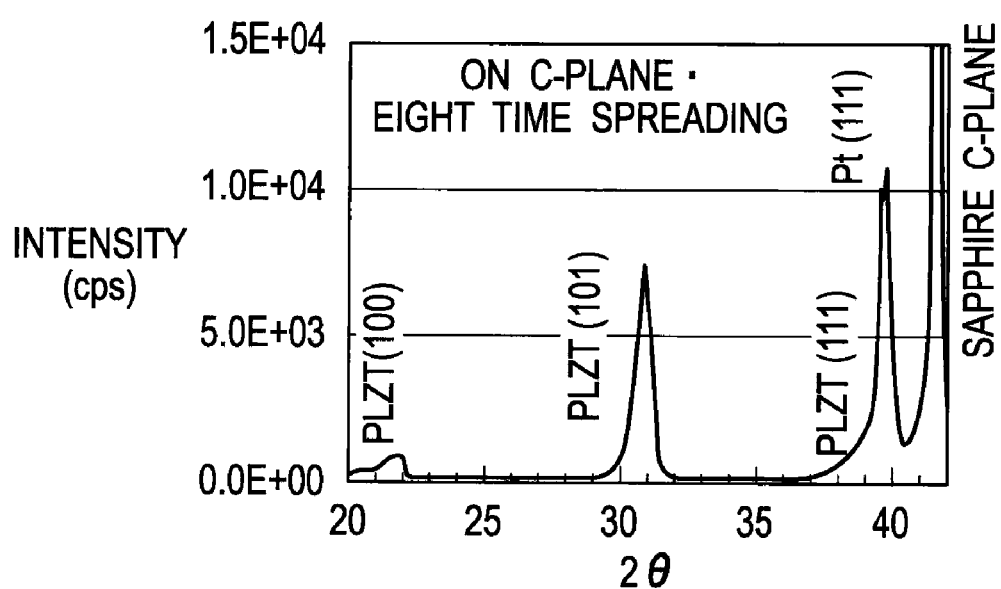
FIG. 9 is a graph (No. 2) measuring a crystal plane of the electro-optic thin film of the light control device according to the embodiment of the present invention by 2θ-ω scan.

The graph shown in FIG. 9 shows the result of 2θ-ω scan. There are a peak of 21.7° indicating the (100) plane of PLZT, a peak of 30.1° indicating the (101) plane of PLZT, a peak of 38.1° indicating the (111) plane of PLZT, a peak of 39.5° indicating the (111) plane of Pt, and a peak of 41.7° indicating the c plane of the sapphire substrate. The graph of FIG. 8 reveals that the crystals of PLZT are oriented in various directions on the c-plane of the sapphire substrate (random orientation).

Figure 10:
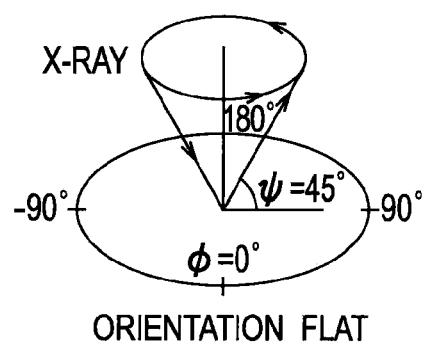
FIG. 10 is a conceptual view showing φ scan for measuring a crystal plane of the electro-optic thin film of the light control device according to the embodiment of the present invention.

Next, whether PLZT is epitaxially grown is checked by φ scan in which a sample is rotated 360° in a plane with the tilt angle φ of the sample being fixed to 45° as shown in FIG. 10. The φ scan is a measurement method used to check whether the thin film is oriented in the in-plane direction.

Figure 11:
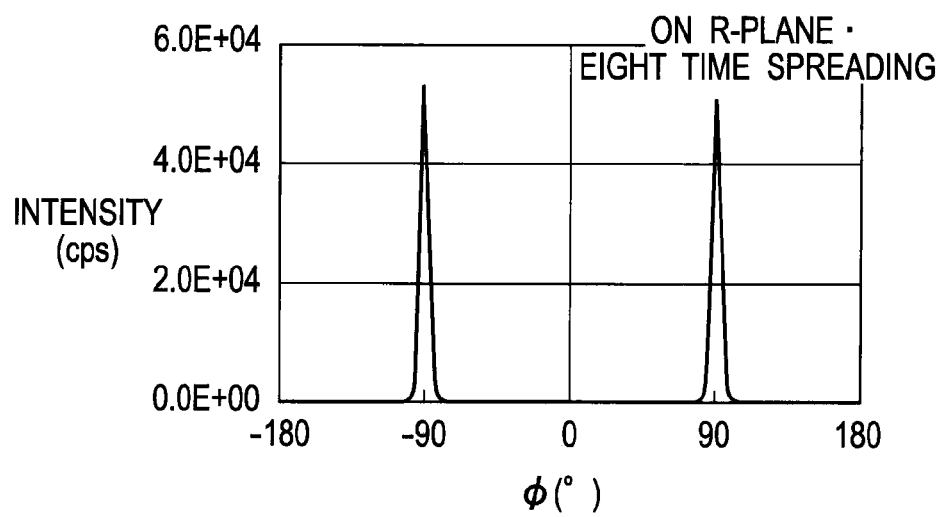
FIG. 11 is a graph (No. 1) measuring a crystal plane of the electro-optic thin film of the light control device according to the embodiment of the present invention by φ scan.

The graph shown in FIG. 11 is obtained by measurement of the intensity of PLZT (100) in which 2θ is 21.7°. As a result of examination of the in-plane orientation of PLZT by the φ scan measurement, two peaks were obtained at positions of −90° and 90° as shown in FIG. 11. This reveals that this sample was epitaxially grown.

Figure 12:
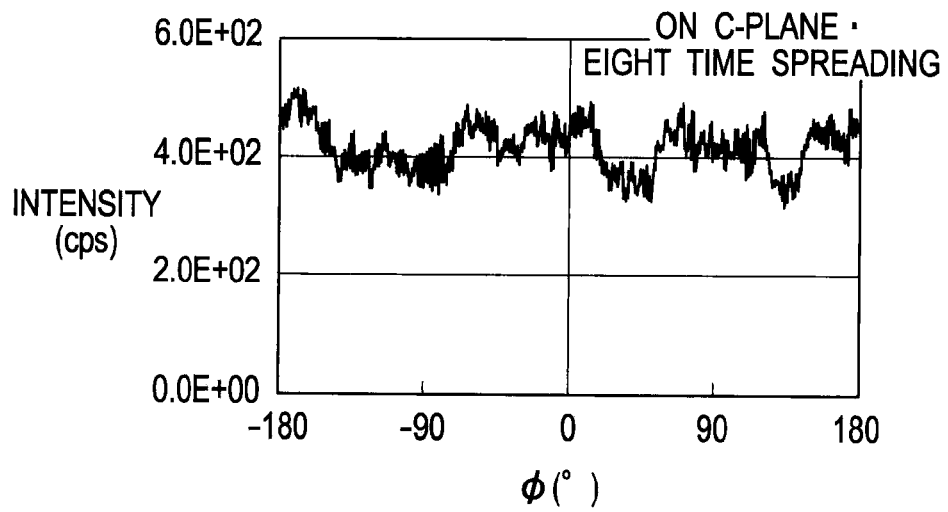
FIG. 12 is a graph (No. 2) measuring the crystal plane of the electro-optic thin film of the light control device according to the embodiment of the present invention by φ scan.

The graph shown in FIG. 12 is a result from measuring the intensity of PLZT (100) in which 2θ is 21.7° like the graph shown in FIG. 11. As a result of the examination of the in-plane orientation of PLZT by φ scan, as shown in FIG. 12, it is not known where the peak of this sample is. In other words, it is known that the sample has random orientation and is not epitaxially grown.

As shown in FIGS. 8 to 12, the preferred orientation of the crystal plane of the electro-optic thin film 20, whether the electro-optic thin film is epitaxially grown, and the like can be known by the measurement of the crystal diffraction intensity by X-ray diffraction.

According to the light control device 1 of the embodiment, by applying the electrical field along the crystal axis of the electro-optic thin film 20, the electro-optic effect can be well exerted. Accordingly, the light shutter operation can be conducted at low operating voltage, and the switching speed of the light shutter operation can be increased.

As shown in FIGS. 13(a) and 13(b), a semiconductor wafer 60 including chips 64 of the light control device 1 according to the embodiment has an orientation flat 62 in the direction of the crystal axis <21•2>. The semiconductor wafer 60 includes: the single crystal substrate 10, the electro-optic thin film 20 which is provided on the single crystal substrate 10 and has the electro-optic effect and whose principal planes is the (111) plane; and a plurality of electrodes 30 and 40 applying the electrical field to the electro-optic thin film 20 at 35° with respect to the orientation flat 62. The single crystal substrate 10 is a sapphire substrate whose principal plane is the R-plane, for example.

In the semiconductor wafer 60 according to the embodiment, the orientation flat 62 extends in the direction of the crystal axis <101> of the electro-optic thin films 20, and the direction at about 35° with respect to the orientation flat 62 is equal to the direction of the crystal axis <101>. Accordingly, by providing the electrodes 30 and 40 so that the electrical field is applied in the direction at about 35° with respect to the orientation flat 62, it is possible to easily provide the electrodes 30 and 40 which apply the electrical field along the crystal axis <111> of the electro-optic thin film 20. To be exact, the angle between the direction that the orientation flat 62 extends and the direction of the crystal axis <111> is $\tan^{-1}(1/2^{1/2}) = 35.26°$. However, the electrodes 30 and 40 may be provided so that the electrical field is applied in the direction at 30 to 40° with respect to the orientation flat 62 in consideration of manufacturing variations and the like.

Figure 13:
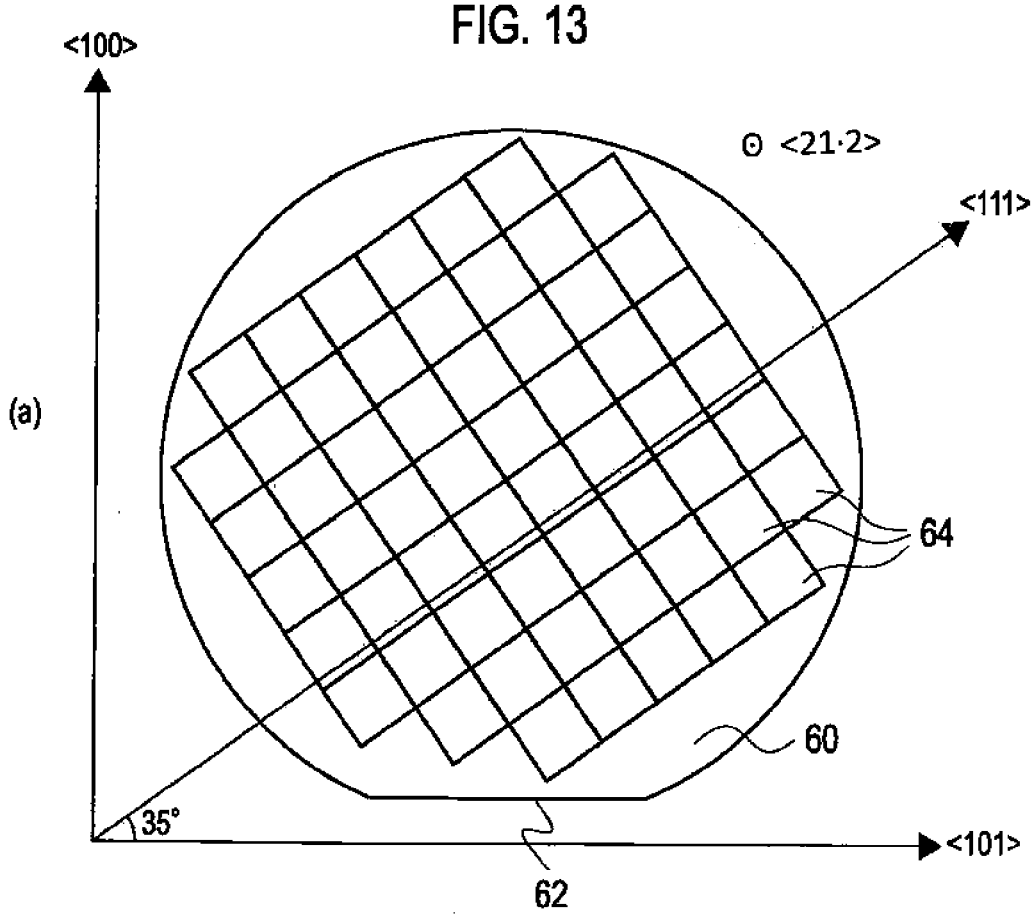
FIG. 13(a) is a plan view of a semiconductor wafer according to the embodiment of the present invention.
FIG. 13(b) is an enlarged view of a chip shown in FIG. 13(a).
Figure 13:
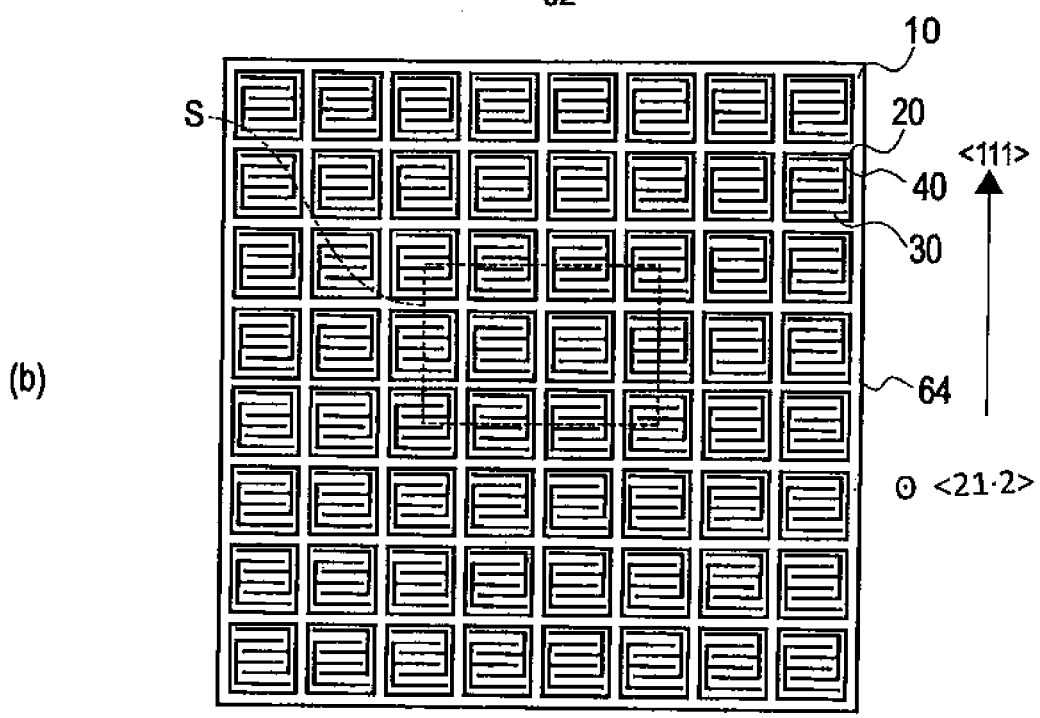
Figure 14:
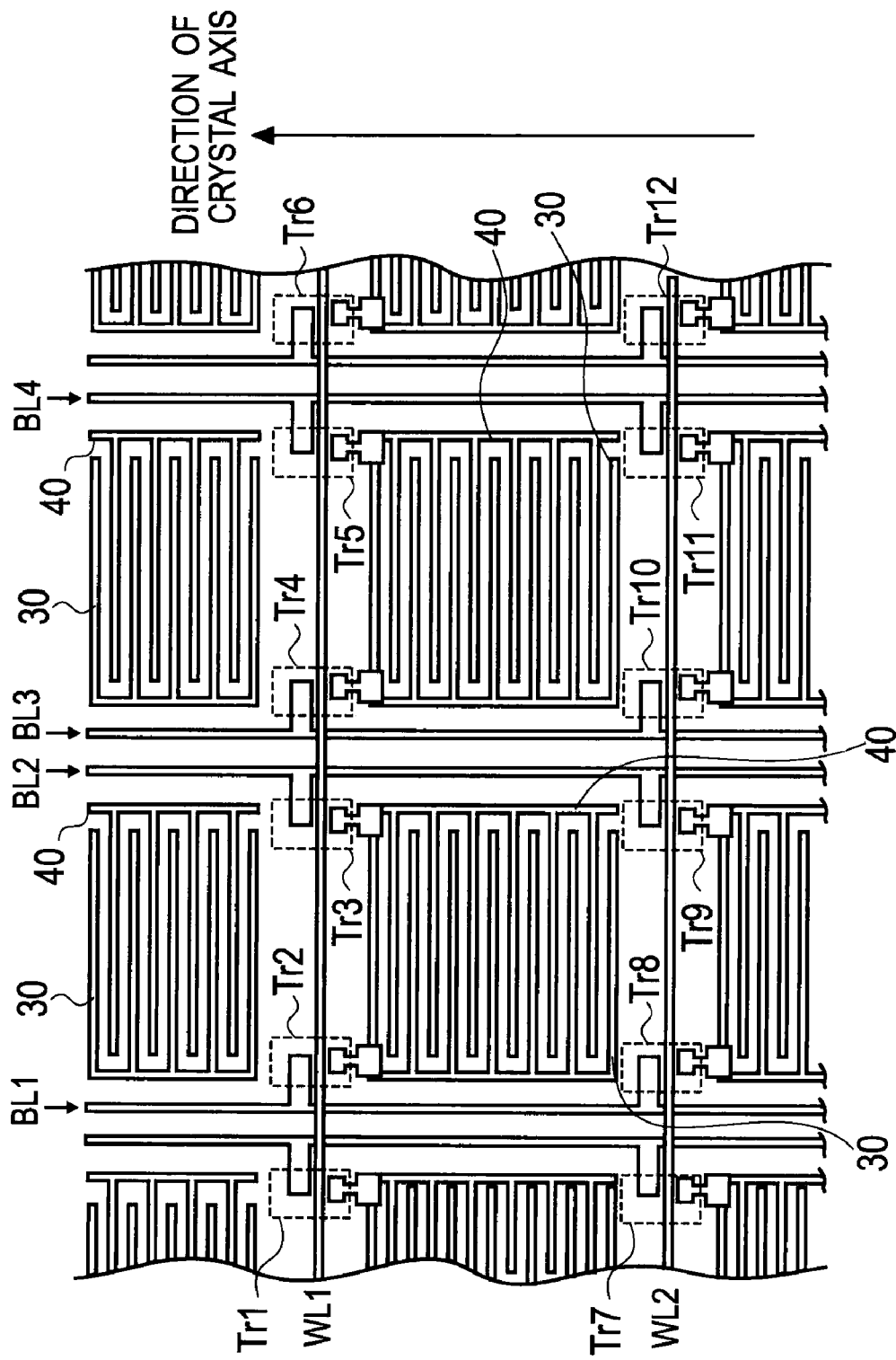
FIG. 14 is a schematic plan view of a light control system according to the embodiment of the present invention.

FIG. 14 is an enlarged view of an area S surrounded by a dot line of FIG. 13(*b*). As shown in FIG. 14, the light control system according to the embodiment includes: a plurality of the light control devices 1 which are arranged in a in a two-dimensional array and each include the single crystal substrate 10; the electro-optic thin film 20 whose principal plane is the (111) plane and provided on the single crystal substrate 10; the plurality of electrodes 30 and 40 which are provided on the electro-optic thin film 20 along the direction of the crystal axis and apply the electrical field along the crystal axis of the electro-optic thin film 20; and transistors Tr1 to Tr12 controlling the voltage supplied to the electrodes 30 and 40. Herein, the principal plane of the electro-optic thin film 20 is (111) plane. Preferably, the electrodes 30 and 40 apply the electrical field along the crystal axis <111> of the electro-optic thin film 20.

The transistors Tr1 to Tr12 are arranged at intersections of word lines WL1 to WL2 and bit lines BL1 to BL4 in a matrix fashion. The transistors Tr1 to Tr12 function as switches to control the voltage supplied to the electrodes 30 and 40 by individually selecting the word lines WL1 to WL2 and the bit lines BL1 to BL4. In the light control system according to the embodiment in which each light control device 1 functions as one pixel, the switching function of the transistors Tr1 to Tr12 enables control of the polarization of light incident on each pixel.

Hereinabove, the example in which the single crystal substrate 10 is composed of a sapphire substrate is explained, but the single crystal substrate 10 may be composed of a silicon substrate. For example, on the single crystal substrate 10 composed of a silicon substrate whose principal plane is the (101) plane, for example, a titanium aluminum nitride ((Ti, Al)N) alloy film with a thickness of about 0.1 µm is formed by sputtering in nitrogen ($N_2$) atmosphere or the like. The ((Ti, Al)N) alloy film is grown according to the plane orientation of the silicon substrate. On the ((Ti, Al)N) alloy film, a platinum (Pt) film with a thickness of about 0.2 µm is formed by sputtering or the like. Subsequently, using photolithography or the like, the ((Ti, Al)N) alloy film and Pt film are patterned to form the electrodes 30 and 40. Thereafter, the PZT or PLZT film is formed on the single crystal substrate 10 as the electro-optic thin film 20 so as to cover the electrodes 30 and 40. Since the principal plane of the single crystal substrate 10 is the (101) plane, the principal plane of the PZT or PLZT film becomes the (101) plane. The film formation method of the PZT or PLZT film can be sputtering, sol-gel process, metal-organic chemical phase deposition (MOCVD), or the like.

When the single crystal substrate 10 is a silicon substrate whose principal plane is the (100) plane, the principal plane of the electro-optic thin film 20 formed on the single crystal substrate becomes the (100) plane. When the single crystal substrate 10 is a silicon substrate whose principal plane is the (111) plane, the principal plane of the electro-optic thin film 20 formed on the single crystal substrate becomes the (111) plane.

Figure 15:
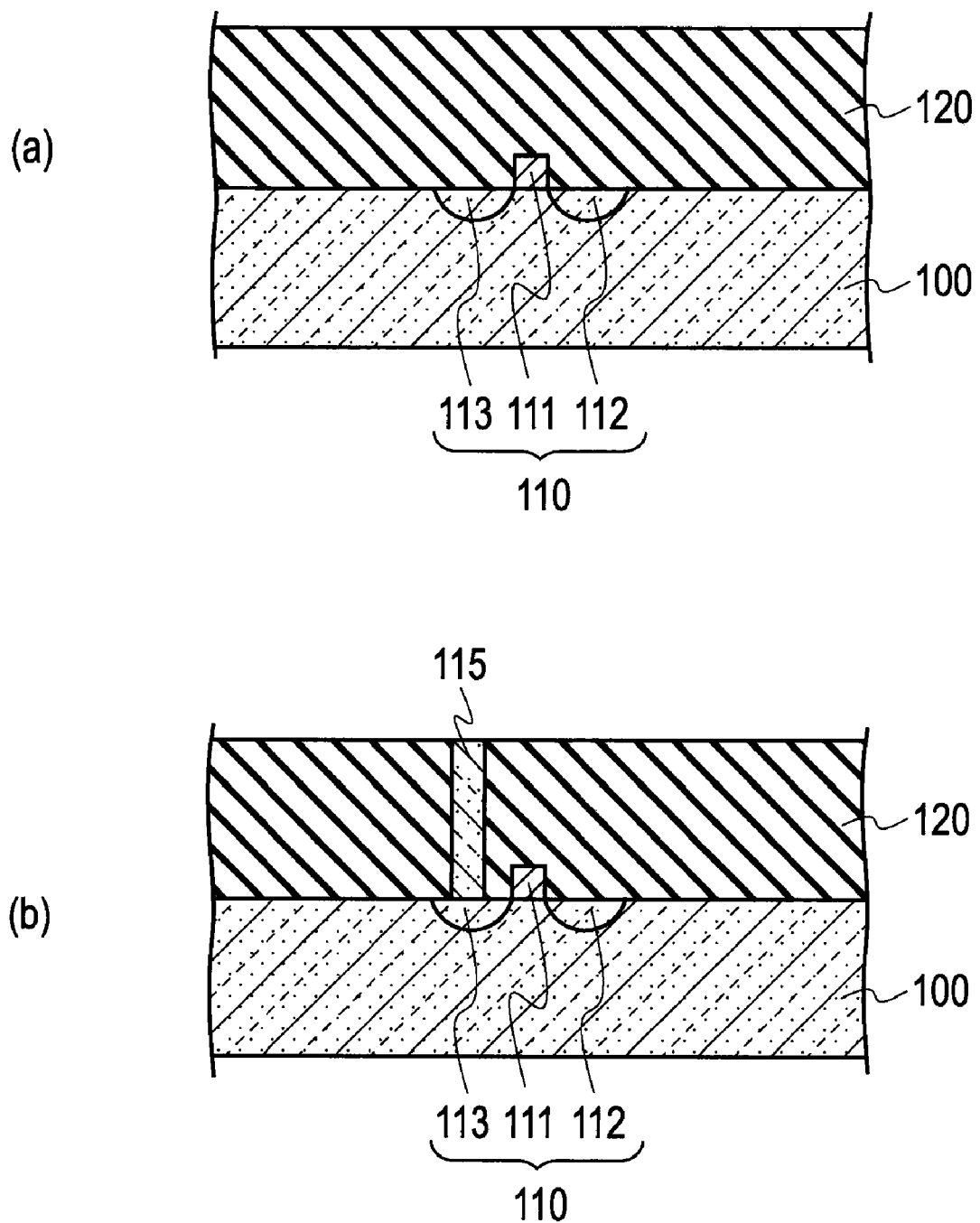
FIGS. 15(a) and 15(b) are cross-sectional process views for explaining a case of employing a silicon substrate for the light control system according to the embodiment of the present invention.

FIGS. 15(*a*) and 15(*b*) show an example of a method of layering the electro-optic thin film on a semiconductor integrated circuit (LSI). As shown in FIG. 15(*a*), a silicon oxide film 120 is formed on a silicon substrate 100 whose principal plane is (101) plane. In the vicinity of the surface of the silicon substrate 100, a transistor 110 having a gate electrode 111, a source electrode 112, and a drain electrode 113 is formed. After contact holes are formed in the silicon oxide film 120, the contact holes are filled with a silicon film by CVD or the like to form contact plugs connected to the electrodes of the transistor 110. FIG. 15(*b*) shows an example in which a contact plug 115 connected to the drain electrode 113 is formed. The upper surface of the contact plug 115 is (101) plane. On the silicon oxide film 120, similarly to the aforementioned method, the (Ti, Al)N alloy film and Pt film are stacked to form the electrodes 30 and 40. The electrodes 30 and 40 are formed so as to come into contact with the upper surface of the contact plug 115. Thereafter, the PZT or PLZT film whose principal plane is the (101) plane is formed as the electro-optic thin film 20. By the aforementioned method, the light control device and system in which the voltage supplied to the electrodes 30 and 40 is controlled by the transistor 110 can be manufactured.

Figure 16:
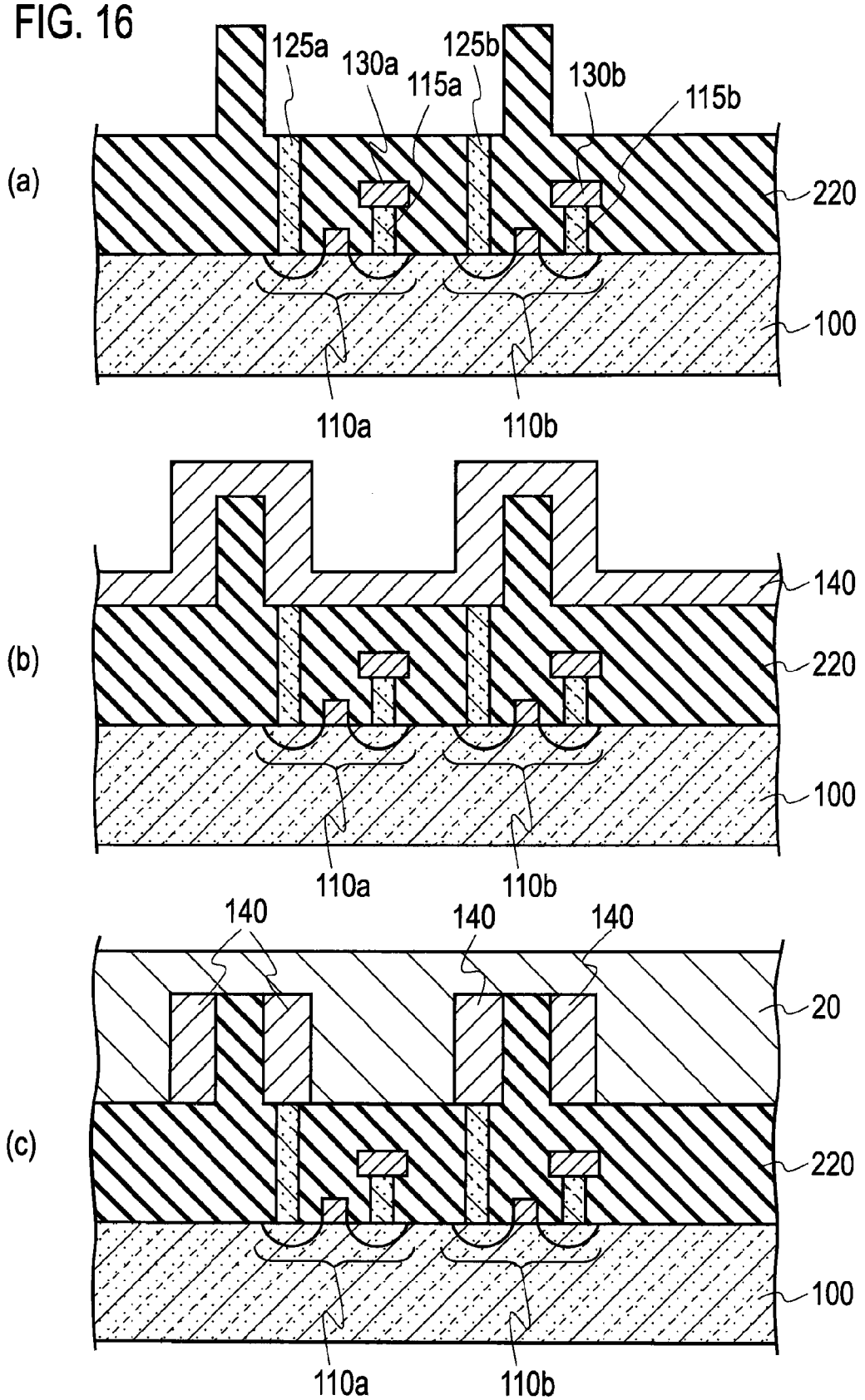
FIGS. 16(a) to 16(c) are cross-sectional process views for explaining a method of forming an electro-optic thin film in which an electrical field is to be generated along a crystal axis <111> of the electro-optic thin film according to the embodiment of the present invention.

FIGS. 16(*a*) to 16(*c*) show an example of the method of forming the electro-optic thin film 20 to produce an electrical field along the crystal axis <111> of the electro-optic thin film 20. As shown in FIG. 16(*a*), the upper surface of the silicon oxide film 220 formed on the silicon substrate 100 is patterned so as to have recesses. In the recessed portions of the silicon oxide film 220, a contact plug 125*a* connected to the transistor 110*a* and a contact plug 125*b* connected to the transistor 110*b* are formed. The upper surfaces of the contact plugs 125*a* and 125*b* are placed near side surfaces of the protrusions of the silicon oxide film 220. In the example shown in FIG. 16(*a*), one of the main electrodes (the source or drain electrode) of the transistor 110*a* is connected to the contact plug 125*a*, and the other main electrode thereof is connected to a wiring layer 130*a* provided in the oxide silicon film 220 through the contact plug 115*a*. Moreover, one of the main electrodes (the source or drain electrode) of the transistor 110*b* is connected to the contact plug 125*b*, and the other main electrode thereof is connected to a wiring layer 130*b* provided in the oxide silicon film 220 through the contact plug 115*b*.

Thereafter, as shown in FIG. 16(*b*), a Pt film 140 is formed on the silicon oxide film 220. At this time, the Pt film 140 tends to be stacked in the <111> axial direction. The normal line of the Pt film 140 extends along the <111> axial direction. The Pt film 140 is then etched so as to expose the upper surface of the silicon oxide film 220 so that only the portions of the Pt film 140 formed on the side surfaces of the protrusions remain. The thickness of the Pt film 140 is determined so that the remaining portions of the Pt film 140 are in contact with the upper surfaces of the contact plugs 125*a* and 125*b*. As shown in FIG. 16(*c*), thereafter, the PLZT or PZT film or the like is formed on the silicon oxide film 220 and Pt film 140 as the electro-optic thin film 20. Since the plane orientation of the Pt film 140 is the (111) plane, the growth principal plane of the PLZT or PZT film formed on the Pt film 140 is the (111) plane. In other words, the electro-optic thin film 20 whose principal plane is the (111) plane is formed on the opposing surfaces of the Pt film 140. One of the opposing surfaces of the Pt film 140 is connected to the electrode of the transistor 110*a* through the contact plug 125*a*, and the other surface thereof is connected to the electrode of the transistor 110*b* through the contact plug 125*b*. By the above method, the light control device and system in which the electrical field is produced along the crystal axis <111> of the electro-optic thin film by control of the transistors 110*a* and 110*b* are manufactured.

The light control system according to the embodiment can be employed by light modulators, optical arithmetic devices, encryption circuits, and the like of display devices, optical communication switches, laser printers, copiers, and holographic memories.

According to the light control system of the embodiment, using the light control device 1 capable of exerting the electro-optic effect well by applying the electrical field along the crystal axis of the electro-optic thin film 20, it is possible to provide the light control system in which the light shutter operation is provided at low operating voltage and switching speed of the light shutter operation is high.

Other Embodiments

As described above, the present invention is described based on the embodiment, but it should not be understood that the present invention is not limited by the description and drawings constituting a part of the disclosure. This disclosure will show various substitutive embodiments, examples, and operating techniques to those skilled in the art.

For example, the electrodes 30 and 40 of the light control device 1 are comb-like electrodes in the embodiment. However, the electrodes 30 and 40, which only need to be electrodes capable of applying an electrical field along the crystal axis of the electro-optic thin film 20, may be a pair of electrodes arranged in parallel to each other, for example.

As described above, it should be understood that the present invention include various embodiments not described here and the like. Accordingly, the present invention is limited only by the features of the invention within the scope of the claims proper from the disclosure.

INDUSTRIAL APPLICABILITY

The light control device, wafer, and system of the present invention are applicable to semiconductor industries and electronic device industries including manufacturer manufacturing light emitting devices having electro-optic thin films provided on substrates.

The invention claimed is:
1. A semiconductor wafer comprising:
a single crystal substrate having an orientation flat extending in a<21·2> crystal direction;
an electro-optic thin film on the single crystal substrate and having an electro-optic effect, a principal plane of the electro-optic thin film being a (101) plane; and
a plurality of electrodes configured to apply an electrical field to the electro-optic thin film in a direction at about 35° with respect to the orientation flat.

\* \* \* \* \*